United States Patent [19]

Belmond

[11] Patent Number: 5,590,744

[45] Date of Patent: Jan. 7, 1997

[54] MOTOR VEHICLE ELECTRIC PARKING BRAKE

[75] Inventor: Jean-Marc Belmond, Les Fosses, France

[73] Assignee: Rockwell Light Vehicle Systems, France

[21] Appl. No.: 552,025

[22] Filed: Nov. 2, 1995

[30] Foreign Application Priority Data

Nov. 3, 1994 [FR] France .................................... 94 13132

[51] Int. Cl.⁶ .................................................... F16D 69/00
[52] U.S. Cl. .......................... 188/265; 188/72.8; 188/2 D
[58] Field of Search ..................................... 188/171, 156, 188/162, 2 D, 72.8, 265; 741/650, 572, 89.15

[56] References Cited

U.S. PATENT DOCUMENTS

| 5,092,432 | 3/1992 | Taig ..................................... 188/171 X |
| 5,148,894 | 9/1992 | Eddy, Jr. ............................. 188/265 X |
| 5,180,038 | 1/1993 | Arnold et al. ......................... 188/171 |
| 5,348,123 | 9/1994 | Takahashi et al. ................. 188/72.8 X |

*Primary Examiner*—Robert J. Oberleitner
*Assistant Examiner*—Peter M. Poon

[57] ABSTRACT

This brake comprises a housing (1) intended to be mounted preferably close to the rear crossmember of the vehicle and which contains a gearwheel (2), a nut (3) fastened axially through the wheel, able to move in translation on either side thereof, and profiled so that it can be driven in rotation by the wheel, cables (8,9) connected to the braking members passing through the housing on each side of the nut and connected to the latter so that the rotation of the nut in one direction or the other gives rise to the application or release of the braking members; an electric motor (16) for driving the wheel in rotation is connected to a control button (17) which can be actuated from the driving position of the vehicle. This brake allows a gain in storage space and habitability of the vehicle, eliminates the need for adjustments upon assembly or during the life of the vehicle, guarantees a balanced distribution of the brake-application force between the two members and reduces the length of the cables.

13 Claims, 4 Drawing Sheets

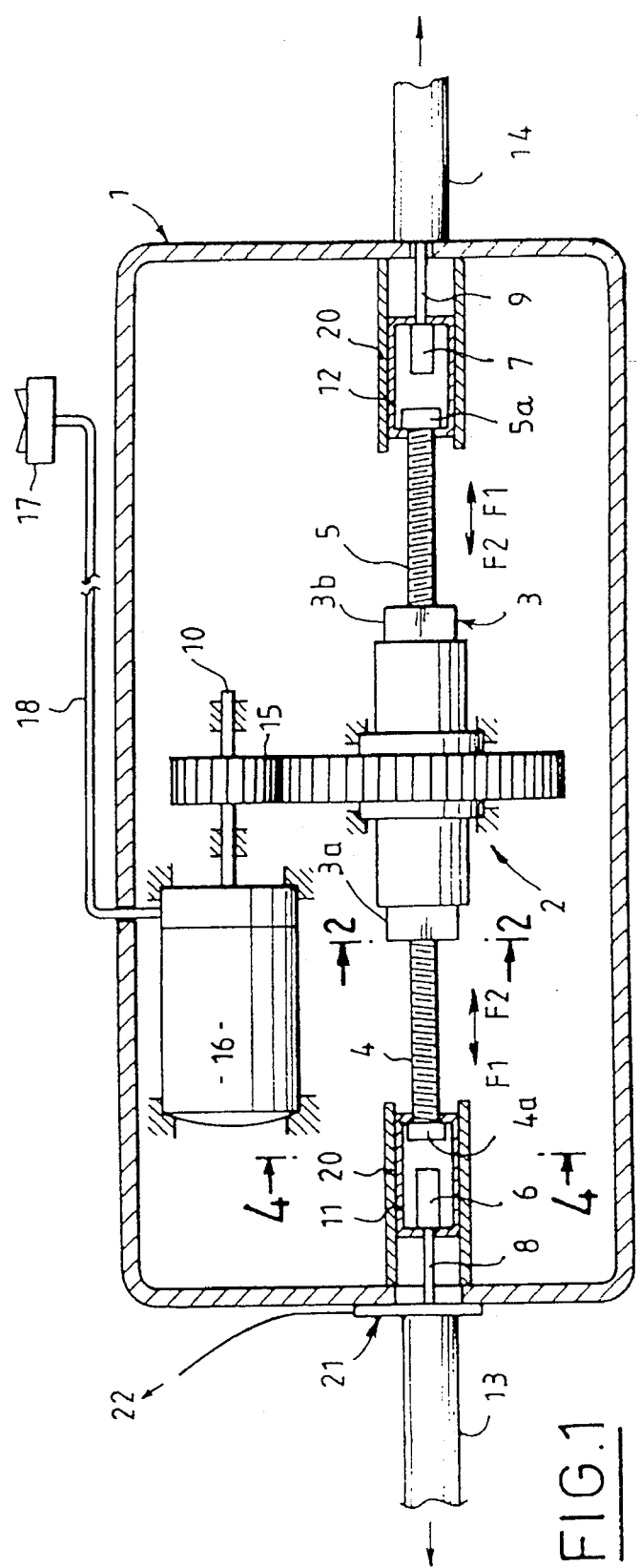
FIG.1
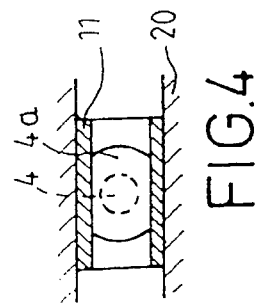
FIG.4
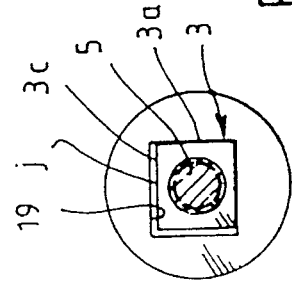
FIG.2
FIG.3

MOTOR VEHICLE ELECTRIC PARKING BRAKE

BACKGROUND OF THE INVENTION

The subject of the present invention is a motor vehicle parking brake.

Hitherto, manually-controlled parking brakes have been made using a lever handle usually placed between the two front seats, or using a specific pedal situated close to the pedals.

These brakes have a significant overall size, require long cables and a balance bar system which have to be fitted between the driving position and the rear axle assembly. They also require adjustment upon assembly and/or during the life of the vehicle, and their optimum effectiveness depends on the physical force of the driver and on the dimensional constraints which result from the vehicle aesthetics choices made by the constructor.

The object of the invention is to provide a parking brake which is designed to avoid these drawbacks.

SUMMARY OF THE INVENTION

In accordance with the invention, the motor vehicle parking brake comprises:

a) a housing which contains a gearwheel mechanically linked to a screw/nut (s) system coaxial with the wheel, one of the elements of which may be driven in rotation by the wheel and drives the second in translation, this system extending axially on either side of the wheel inside which the element which is driven in rotation can move in translation on either side of the said wheel, b) cables passing through the housing on either side of the wheel, these being respectively connected on the one hand to the corresponding translatable element of the screw/nut (s) systems as well as, on the other hand, to braking members, c) an electric gear motor unit for driving the wheel in rotation, connected to a control button which can be actuated from the driving position of the vehicle, so that the rotation of the wheel can pull the cables together or allow them to move apart depending on the direction of rotation of the motor and of the said wheel and therefore bring about application or release of the braking members.

The overall size of this electric brake is considerably reduced by comparison with usual mechanical brakes, which results in a gain in storage space, comfort and habitability of the vehicle. Furthermore, the long cables of usual hand brakes are replaced by very short portions of cables, by virtue of the housing being positioned near the rear axle assembly of the vehicle. This results in an improvement in effect in terms of load by reducing the losses generally observed on long cable runs which include greater or lesser curves.

The electric motor of the gear motor unit is for example of the type used for window lifters or seats, its output shaft bearing a pinion for driving the gearwheel or a lay pinion.

According to one embodiment of the invention, the screw/nut (s) system comprises a nut axially passing through the wheel, profiled so that it can be driven in rotation by the latter, and the opposing parts, extending on either side of the wheel, are provided with opposite screw threads and take screws of opposite hand, locked in terms of axial rotation and connected to the terminal parts of the cables by holders in which the said terminal parts and the heads of the screws are housed, the screw/nuts system being irreversible by virtue of a suitable profile on the screw threads.

The nut advantageously has a profile which complements that of an axial passage opening in the wheel, a functional clearance being left between the perimeter of the opening and the profile of the nut.

This functional clearance between the nut and the wheel, while satisfactorily preserving the capability of driving the nut by the wheel, makes it possible to avoid varying the distance between the axis of the wheel and the axis of the pinion during the manoeuvres of applying or releasing the brake. Indeed, it will be understood that the absence of such clearance could give rise to transverse shifts of the wheel, and therefore to parasitic variations in the distance between the axis of the wheel and that of the output pinion of the motor, which would detract from the correct operation of the brake. This clearance therefore makes it possible to absorb any drifts in alignment.

According to another embodiment of the brake, the screw/nuts system includes a screw consisting of two opposed parts of opposite screw threads, extending on either side of the gearwheel, and of a central part which is profiled to allow the screw to be driven in rotation by the wheel, and this system also comprises two nuts, each one fitting onto one part of the screw, as well as means for blocking the nuts in terms of rotation, these nuts being connected to the respective ends of the cables.

BRIEF DESCRIPTION OF THE DRAWINGS

Other specific features and advantages of the invention will emerge during the description which will follow, given with reference to the appended drawings which illustrate one embodiment thereof by way of non-limiting example.

FIG. 1 is a longitudinal elevation and part section of one embodiment of the motor vehicle parking brake according to the invention.

FIG. 2 is a cross-section on 2—2 of FIG. 1.

FIG. 3 is an elevation and part section of a sheath stop of FIG. 1.

FIG. 4 is a cross-section on 4—4 of FIG. 1 illustrating the stop for preventing the rotation of the screws moving in translation in the nut.

DESCRIPTION OF THE PREFERRED EMBODIMENTS

Figure 5:
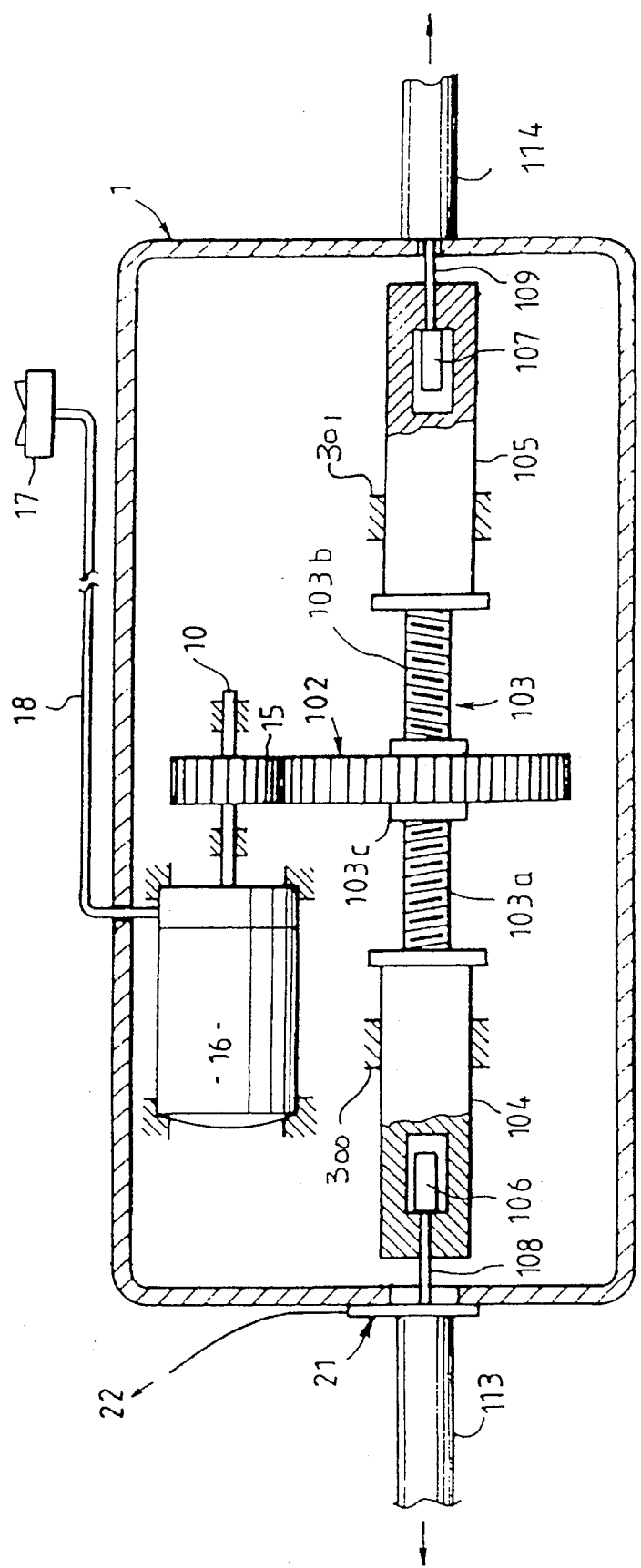
FIG. 5 is a simplified view similar to FIG. 1, of a second embodiment of the brake according to the invention.

The motor vehicle parking brake represented in FIGS. 1 and 2 comprises a housing 1 intended to be mounted for preference, but without any limitation being implied, close to the rear crossmember (not represented) of the vehicle, and which contains a gearwheel 2 a nut 3 passing axially through the wheel 2 and able to slide in translation on either side thereof. The nut 3 consists of two parts 3a, 3b which extend on either side of the wheel 2 coaxially therewith, and are tapped, one with a left-handed thread and the other with a right-handed thread. These two parts 3a, 3b take respective screws 4, 5, blocked in terms of rotation and connected to the terminal parts 6, 7 of respective brake cables 8, 9 by holders 11, 12 mounted in supports 20 fixed internally to the housing 1. These holders contain the heads 4a, 5a of the screws 4, 5 and the terminal parts 6, 7 of the cables 8, 9, which cables are connected to corresponding braking members which have not been represented.

The cables 8, 9 are passed through the lateral walls of the housing 1 and, on the other side thereof, are housed in sheaths 13, 14.

The gearwheel 2 meshes with a pinion 15 mounted on an output shaft 10 of an electric motor 16 housed in the housing 1, as are the aforementioned elements (with the exception of the sheaths 13, 14 and corresponding portions of cable). This motor 16 is powered by the battery (not represented) of the vehicle and may, for example, be a 12-volt battery. The motor 16 may be switched on from a manual control button 17 to which it is connected by an electrical connection 18, this control button 17 being placed in the driving position of the vehicle, close to the driver.

The nut 3 has a profile 3c complementing that of an axial passage opening 19 in the wheel 2, it being possible for these two profiles to be square for example as represented in FIG. 2. A functional clearance 1 is left between the perimeter of the opening 19 and the profile of the part 3c.

The screws 4, 5 may be blocked in terms of rotation by any suitable means, for example a shape of screw head 4a–5a as represented in FIG. 4, indexed in terms of rotation in the complementary housings of the holders 11, 12, which holders can slide in longitudinal slots inside the supports 20.

The sheaths 13, 14 are equipped with stops on the housing 1, one 21 of these being removable, for example by means of a cable 22 connected to a manual extraction pull-cord not represented. This arrangement makes it possible, by pulling on the pull-cord and removing the stop 21 to cause the sheath 13 to enter inside the housing 1 to allow, if necessary, emergency brake release in the event of a breakdown in the electrical system (16, 17). In this case, the guide length (not represented) of the cable 8 under tension is reduced, which causes the cable 8 to relax and causes a translation of the nut in the wheel going in the direction of the cable 9 relaxing.

The screws 4 and 5 are of opposite hand so that owing to the double tapping of opposite hand in the nut 3, a rotation of the latter in one direction or the other leads either to the screws 4, 5 moving in translation in the direction which expels them from the wheel 2 (arrows F1) and therefore reduces the tension in the cables 8, 9 and releases the braking members, or in the opposite direction (arrows F2). In this case, the screws 4, 5 move into the corresponding parts 3a, 3b of the nut 3, which causes an increase in the tension of the cables 8, 9 and therefore applies the braking members.

A control button 17 has three states (rest, brakes applied, brakes released) in the image of those currently used on window-lifter controls. The equivalent to the pulsed control function in window lifters may be envisaged for controlling brake application or brake release according to the invention.

The cables 8, 9 connecting the braking members to the application mechanism (2, 3, 4, 5) are conventional, of the single-stranded type, with single-wound sheaths 13, 14. Other types of cable and sheath may be envisaged, depending on the energy margin requirements upon brake application (multi-strand, double-wound sheaths, . . . ). The sheath stops are made on the stationary parts of the braking members on the one hand, and on the housing 1 of the brake mechanism on the other hand. The emergency pull-cord for removing the removable stop 21 is positioned in a location which the user can easily access.

The motor 16 may be of the type used not only for window lifters but also for controlling seats. It drives a simple reduction unit of the pinion 15/wheel 2 type. A command effected from the button 17 switches the motor 16 on in one direction or the other and the reduction unit consisting of the pinion 15 and the associated wheel 2 drives the nut 3 in rotation. The possibility for axial translation of the nut 3 in the wheel 2 offers the advantage of preventing an axial force being exerted on the wheel 2 in the event that the travel/force laws followed by the screws 4, 5 are different, which should give rise to troublesome effects.

The brake is kept in the applied position by virtue of the irreversability of the screw 4, 5/nut 3 system (device with purely mechanical action) and this is owing to the fact that, in a way known per se, the profiles of the screw threads of the screws 4, 5 and of the tappings of the nut 3 are produced in a suitable manner. For this reason, when the motor 16 is no longer actuated, the mechanism remains in the position in which the braking members are either applied or released, as long as the motor 16 has not been actuated in the opposite direction.

The second embodiment of the brake according to the invention, represented diagrammatically in FIG. 5, differs from the previous one in that the gearwheel 2 drives not a nut but a screw 103. The latter consists of two opposed parts 103a, 103b, of opposite screw threads, extending on either side of the wheel 102 and of a central part 103c, which is profiled to allow the screw 103 to be driven in rotation by the wheel 102.

This system also comprises two nuts 104, 105, each fitting over a part 103a, 103b of the screw 103 and connected to the end ferrules 106, 107 of the cables 108, 109. These ferrules may, as represented, be housed in the nuts 104, 105, while the cables 108, 109 are guided in sheaths 113, 114 outside the housing 1. Means, represented in breakaway partial form 300, 301 in FIG. 5, are also provided for blocking the nuts 104, 105 in terms of rotation when they are driven in translation by the rotation of the screw 103.

The motor vehicle parking brake represented in FIGS. 6 to 9 is produced according to the principle of FIG. 5.

It comprises a housing 101 formed of two half-casings 101a and 101b, which is intended to be mounted preferably, with no obligation implied, close to the rear crossmember of the vehicle and which contains a gearwheel 102, a screw 103 passing axially through the wheel 102 and able to slide in translation on either side thereof.

The screw 103 consists of two parts 103a and 103b threaded one to the left and the other to the right, extending on either side of the wheel 102 coaxially therewith, and of a central part 103c allowing indexing in terms of rotation of the screw 103 in the wheel 102 with a functional sliding clearance i between the profile 103c and the opening 119 in the wheel 102. The two parts 103a and 103b have respective nuts 104, 105 fitted onto them, these being blocked in terms of rotation and connected to the terminal parts 106, 107 of the brake cables 108, 109 by respective heads 104a, 105a in which there are formed housings which contain ferrules 106, 107 integral with the ends of the cables 108, 109 connected to corresponding braking members which have not been represented.

The brake cables pass through sheath stops 121, 122 and, outside of these, are housed in sheaths 113, 114. The tubular section of the sheath stops 121, 122 allows them to be fitted snugly onto the respective half-casings 101a, 101b.

The gearwheel 102 meshes with a lay pinion 124 which provides intermediate reduction. The shaft 126 of the lay pinion 124 has one end 123 of suitable shape, for example hexagonal, accessible from outside the housing 101 and intended to allow emergency brake release in the event of a breakdown of the electrical system.

The lay pinion 124 meshes with a pinion 115 mounted on an output shaft 110 of an electrical motor 116 fitted snugly onto the half-casing 101a. This motor 116, of a type similar to the motor 16 and whose rotor 116a, stator 116b and collector housing 116c may be seen, is powered by the battery (not represented) of the vehicle and may, for example, be a 12-volt motor. The motor 116 may be switched on from the driving position as in the first embodiment described previously.

Figure 9:
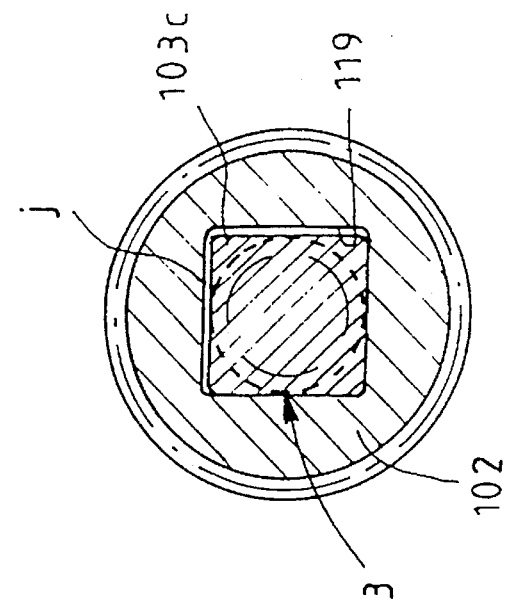
FIGS. 7, 8 and 9 are part sections on 7—7, 8—8 and 9—9 respectively of FIG. 6.

The screw 103 has a central profile 103c which complements that of the axial passage opening 119 in the wheel 102, it being possible for these two profiles to be square for example as represented in FIG. 9. The axial clearance of the wheel 102 is limited, on the side where the nut 105 is situated, by a truncated cylinder 140, integral with the half-casing 101b and through which the profile 103c passes. The pinion 124 engages in the truncated part of the stop cylinder 140, which is such that it prevents the wheel 102 from coming into contact with the pinion 124.

Figure 6:
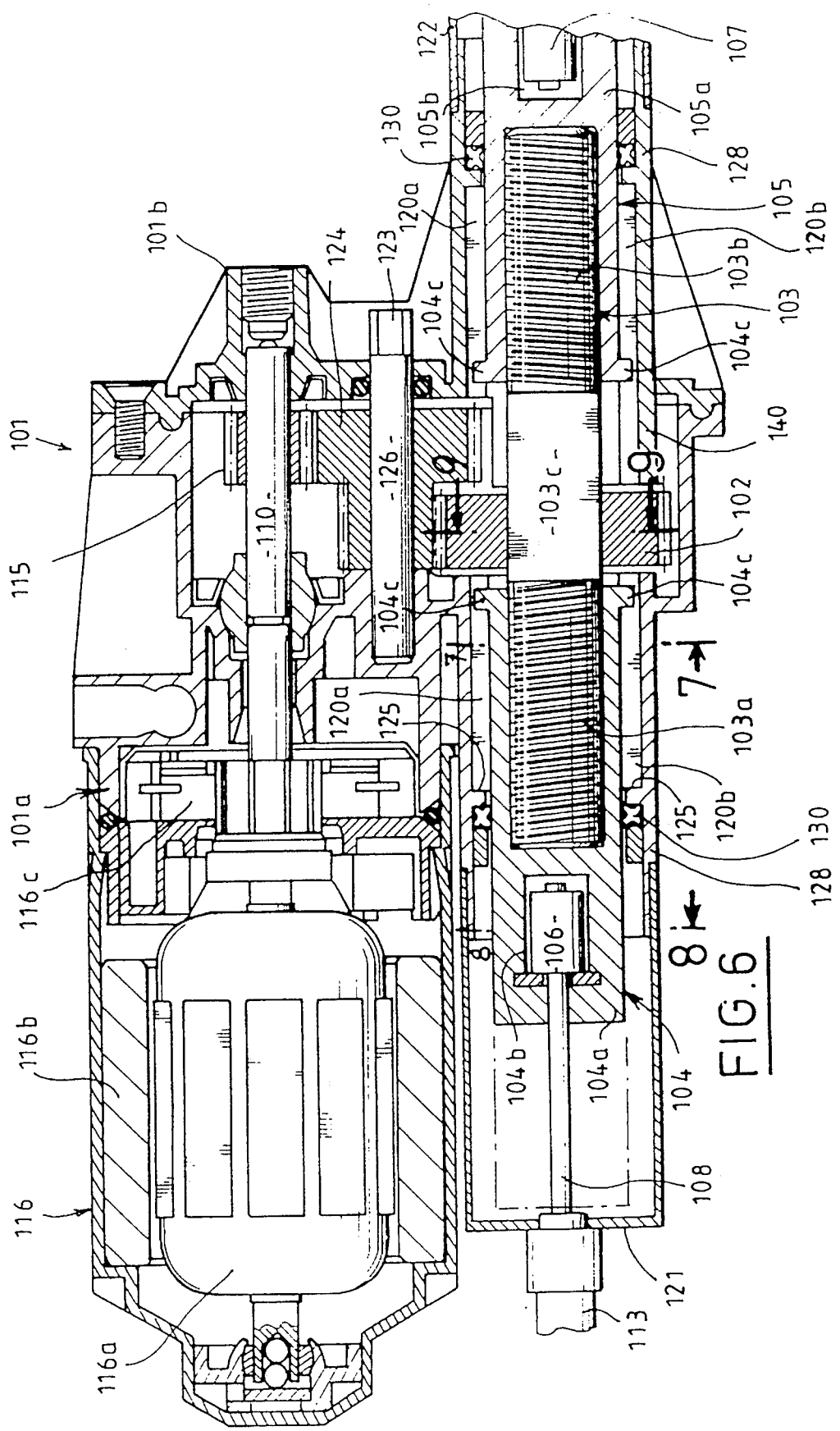
FIG. 6 is a half longitudinal section, half elevation and with cutaway of an industrial embodiment of a brake in accordance with the embodiment of FIG. 5.
Figure 7:
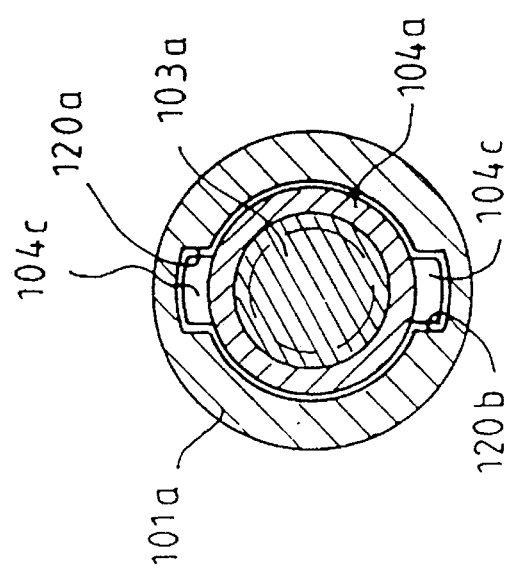

The nuts 104, 105 are blocked in terms of rotation by any suitable means, for example, for each nut, two longitudinal slots 120a and 120b made in the half-casings 101a, 101b, in which slots there may slide two respective studs 104c integral with the nuts 104, 105, as represented in FIGS. 6 and 7. Radial stops 125 bound the slots 120a, 120b opposite the studs 104c and serve as end-of-travel buffers for the nuts 104, 105. Beyond the stops 125, seals 130 are interposed between the nuts and the walls of fittings 128 containing the nuts 104, 105 and the threaded parts 103a, 103b.

Figure 8:
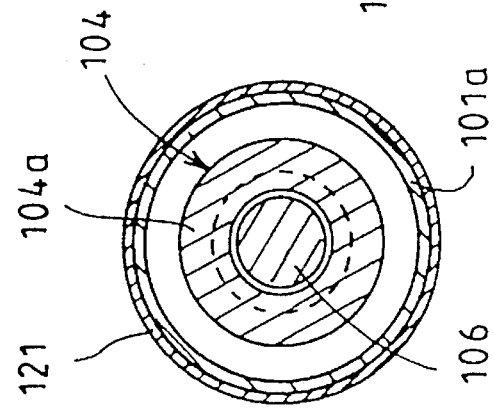

The sheaths 113, 114 are stopped on the housing 101 by sheath stops 121, 122 of tubular shape which fit snugly over the fittings 128 of the respective half-casings 101a, 101b (FIGS. 6 and 8).

The principle of the control of the motor and of the sheath stops on the braking members' side remain identical to the one described in the first embodiment having one nut and two screws.

A command made from the control button (not represented) switches on the motor 116 in one direction or the other, and the reduction unit drives the screw 103 in rotation.

The nuts 104 and 105 are of opposite hand so that, owing to the respective threaded parts 103a and 103b, a rotation of the screw 103 in one direction or the other leads to the movement of the nuts in translation either in the direction which moves them away from the wheel 102 and therefore reduces the tension in the cables 108 and releases the brake members, or in the opposite direction. In the latter case, the nuts 104, 105 engage on the respective parts 103a, 103b of the screw 103 so that more and more threads are engaged, which increases the tension in the cables 108, 109 and therefore increases the application of the braking members.

The possibility for the screw 103 to move in translation in the wheel 102 offers the advantage of preventing an axial force being exerted on the wheel 102 in the event of the travel/tension increase force laws of the cables 108, 109 being different, something which would lead to troublesome effects as in the embodiment of FIGS. 1 to 4.

The advantages set forth in the case of the first embodiment described (one nut 3, two screws 4, 5) are also achieved with the embodiments of FIGS. 5 to 9.

In addition to the technical advantages mentioned hereinabove, the brake according to the invention offers the following:

a) this brake mechanism does not require any adjustment, either upon assembly or during the life of the vehicle.

The device is self-balancing in terms of force, between the two brake members by virtue of the possibility of the nut 3 or of the screw 103 moving in translation in the wheel 2.

This system involves no hole in the transmission tunnel which would have to be replugged, which eliminates the soundproofing elements necessary with conventional brakes, as well as the blanking plate.

There are no longer any forces to be withstood by the transmission tunnel, which avoids the fitting of a strengthening plate. Any differentiation between left-hand drive and right-hand drive disappears, and standardization therefore becomes possible. The assembly of the vehicle is simplified and, by virtue of the invention, the style integration constraints are substantially reduced.

b) From the user's point of view, the brake according to the invention offers other advantages:

optimum effectiveness regardless of physical capabilities of the driver, improved acoustic comfort (elimination of the hole in the transmission tunnel), optimizable fitting of the speed controls, no difference in travel/force law to be dealt with when operating the brake, regardless of the members (drums, discs, or dual servos) being acted upon.

c) The forces are self-balancing between the left-hand wheel and right-hand wheel, the main forces being located on the screws/nuts/holders system.

The braking system according to the invention may be used within the context of a passive safety device, in the sense that the combination of detecting the absence of the driver, and movement of the vehicle may automatically cause the brake to be applied. Bearing in mind the balancing of the forces which is obtained between the left-hand member and the right-hand member, that is to say between the left-hand and right-hand wheels, the braking system in accordance with the invention may be combined with an "ABS" (registered trademark) device, with extended use to emergency braking. Finally, it is possible to modulate brake release for hill starts, it being possible for this modulation to be manual or programmed as a function of the engine torque or wheel torque.

I claim:

1. A motor vehicle parking brake in a braking system having first and second braking members, said parking brake comprising:

a housing containing a gearwheel, said gearwheel being mechanically linked to a screw-nut mechanism, said screw-nut mechanism aligned coaxial with said gearwheel, said screw-nut mechanism having driving and driven elements wherein said driving element is adapted to be driven in rotation by said gearwheel, and wherein said driven element is correspondingly driven in translation by said driving element relative to said driving element and said gearwheel, said driving element having first and second extensions extending axially on either side of said gearwheel and said driven element having first and second driven components, first and second cables passing through said housing on either side of said gearwheel, said first cable having a first end and a second end, said second cable having a first end and a second end, said first end of said first cable connected to said first driven component and said first end of said second cable connected to said second driven component, said second end of said first cable connected to said first braking member and said second end of said second cable connected to said second braking member, and an electric gear motor unit for driving said gearwheel in rotation, said motor unit connected to a control button actuable by an operator of the vehicle, wherein rotation of said gearwheel alternatively pulls said first and second cables together and alternatively allows said cables to move apart depending upon the direction of rotation of said motor unit and of said gearwheel to thereby alternately bring about application and release of said first and second braking members.

2. An apparatus according to claim 1, wherein said driving element comprises a nut axially passing through said gearwheel, said nut driven in rotation by said gearwheel, said first and second extensions of said driving element comprising first and second threaded extensions of said nut extending on either side of said gearwheel wherein said first and second threaded extensions have opposite screw threads, and wherein said first and second driven components are take screws threaded into said first and second threaded extensions, said take screws each having a head, said take screws being respectively connected to said first ends of said cables by holders, said holders housing said first cable ends and said heads, said threaded extensions and take screws having a screw pitch adapted so as to make said screw-nut mechanism irreversible.

3. An apparatus according to claim 2, wherein said nut has a profile having an outer perimeter which compliments that of an axial passage opening in said gearwheel, said passage opening having a perimeter slightly larger than said perimeter of said nut and thereby providing a functional clearance between the perimeter of the opening and the profile of the nut.

4. An apparatus according to claim 3, wherein said take screws are blocked in terms of rotation by said heads of said take screws rotationally interfering with said holders, wherein said holders slide in internal longitudinal slots of supports fixed inside said housing.

5. An apparatus according to claim 1, wherein said screw-nut mechanism includes a screw having two opposed parts wherein each of said opposed parts has opposite screw threads, each of said opposed parts extending, respectively, on either side of the gearwheel, said screw further having a central part interposed between said opposed parts and having a profile adapted to engage drivingly with said gearwheel so that said screw is driven in rotation by said gearwheel, and wherein said screw-nut mechanism further includes two nuts, each of said nuts fitting, respectively onto one of said opposed parts, said screw-nut mechanism further including means for blocking the nuts in terms of rotation, wherein said nuts are connected to said first ends of the cables.

6. An apparatus according to claim 5, wherein said motor unit has an output pinion, and wherein said brake further includes a lay pinion mounted between said output pinion and the gearwheel, wherein said lay pinion meshes with said output pinion and said gearwheel.

7. An apparatus according to claim 6, wherein said first and second cables have sheaths surrounding the cables outside the housing and wherein said first ends of said cables are fitting with ferrules, and wherein each of said nuts has a head, each head having a ferrule housing for receiving, respectively, said first and second cable ferrules for fixing the first end of the corresponding cable to said nuts, and wherein said brake further includes two tubular sheath stops fitted snugly onto the housing, each of said stops having passageways through each of which passes, respectively, said first and second cables, said stops acting as top buffers for said sheaths.

8. An apparatus according to claim 7, wherein said means for blocking the nuts in terms of rotation comprise studs projecting laterally from said nut, said studs adapted to slide in longitudinal slots formed in a lower wall of the housing, wherein said longitudinal slots each have an inner-more end and an outer-more end and wherein each of said slots further each have an end-of-travel stop for limiting longitudinal travel of the studs and for limiting longitudinal travel of the nuts, said end-of-travel stops located at the outer-more ends of the slots.

9. An apparatus according to claim 8, wherein said lay pinion has a shaft and wherein said shaft has one end which is accessible from outside the housing, said one accessible end having a shape adapted to engage a separate tool, wherein said tool engages said shaft from outside said housing and permits manual rotation of said lay pinion.

10. An apparatus according to claim 6, wherein said first and second cables each have portions thereof which extend outside of said housing, and wherein said first cable has a sheath covering said portions of said first cable extending outside of said housing and wherein said second cable has a sheath covering said portions of said second cable extending outside of said housing, and wherein said first cable sheath is equipped with at least one removable stop and at least one non-removable stop abutting said housing, and wherein said second cable sheath is equipped with at least one removable stop and at least one non-removable stop abutting said housing, and wherein said removable stops, when removed, permit said sheaths to enter said housing to permit a manual override and corresponding release of said parking brake mechanism.

11. An apparatus according to claim 10, wherein said housing comprises two half-housings and wherein said motor unit has an output shaft, and wherein said lay pinion has a shaft, and wherein said output shaft and said lay pinion shaft and said screw each extend into each of said half housings, and wherein the motor unit is mounted to one of said half-housings and wherein each said non-removable sheath stop is snugly fitted onto a fitting of each half-housing.

12. An apparatus according to claim 1, wherein said electric gear motor unit is selected from the group consisting of a type designed for a window lifter and a type designed for a motorized seat, and wherein said motor unit has an output shaft which carries a pinion, said pinion adapted for meshing with the gearwheel and with a lay pinion.

13. An apparatus according to claim 1, wherein said first and second cables each have portions thereof which extend outside of said housing, and wherein said first cable has a sheath covering said portions of said first cable extending outside of said housing and wherein said second cable has a sheath covering said portions of said second cable extending outside of said housing, and wherein said first cable sheath is equipped with at least one removable stop and at least one non-removable stop abutting said housing, and wherein said second cable sheath is equipped with at least one removable stop and at least one non-removable stop abutting said housing, and wherein said removable stops, when removed, permit said sheaths to enter said housing to permit a manual override and corresponding release of said parking brake mechanism.

* * * * *